(12) United States Patent
Kiehl

(10) Patent No.: US 6,927,709 B2
(45) Date of Patent: Aug. 9, 2005

(54) TRANSMISSION AND RECEPTION INTERFACE AND METHOD OF DATA TRANSMISSION

(75) Inventor: Oliver Kiehl, Charlotte, VT (US)

(73) Assignee: Infineon Technologies AG, Munich (DE)

(*) Notice: Subject to any disclaimer, the term of this patent is extended or adjusted under 35 U.S.C. 154(b) by 286 days.

(21) Appl. No.: 10/196,676

(22) Filed: Jul. 16, 2002

(65) Prior Publication Data

US 2003/0048210 A1 Mar. 13, 2003

(30) Foreign Application Priority Data

Jul. 16, 2001 (DE) ............................................ 101 34 472

(51) Int. Cl.[7] ............................ H03M 7/00; H03M 7/20
(52) U.S. Cl. .................................... 341/102; 341/106
(58) Field of Search ................................ 341/102, 106, 341/107, 50, 58, 59; 327/41; 375/292; 380/42; 710/107

(56) References Cited

U.S. PATENT DOCUMENTS

| | | | | |
|---|---|---|---|---|
| 4,517,552 A | * | 5/1985 | Shirota et al. ................ 341/58 |
| 4,520,346 A | * | 5/1985 | Shimada ...................... 341/58 |
| 4,620,311 A | * | 10/1986 | Schouhamer Immink ... 375/292 |
| 5,278,902 A | * | 1/1994 | Nugent ........................ 380/42 |
| 5,587,710 A | * | 12/1996 | Choo et al. ................. 341/107 |
| 5,638,063 A | * | 6/1997 | Ino ............................. 341/50 |
| 5,696,505 A | * | 12/1997 | Schouhamer Immink .... 341/59 |
| 5,920,274 A | * | 7/1999 | Gowda et al. .............. 341/155 |
| 6,151,648 A | * | 11/2000 | Haq ........................... 710/107 |
| 6,160,423 A | * | 12/2000 | Haq ............................ 327/41 |
| 6,265,994 B1 | * | 7/2001 | Kahlman ..................... 341/58 |

FOREIGN PATENT DOCUMENTS

| | | | |
|---|---|---|---|
| DE | 38 90 947 C2 | | 5/1985 |
| EP | 655850 | * | 5/1995 |
| WO | 89/04517 | | 5/1989 |

* cited by examiner

*Primary Examiner*—Patrick Wamsley
(74) *Attorney, Agent, or Firm*—Laurence A. Greenberg; Werner H. Stemer; Gregory L. Mayback

(57) ABSTRACT

An N-bit word is produced from an M-bit code received on an M-bit line, M being larger than N, the M-bit code comprising at least an M-bit code word and a previous M-bit code word, the M-bit code word comprising different levels at at least two bit positions, and the previous M-bit code word comprising levels opposite to the different levels at the corresponding bit positions, by comparing the levels at the two bit positions of the M-bit code word to obtain a first value, comparing the levels at the two corresponding bit positions of the previous M-bit code word to obtain a second value, detecting that the first value is opposite to the second value, and decoding the M-bit code word responsive to detecting that the first value is opposite to the second value. An advantage of the present invention is that all the lines taking part in the transmission have the same electrical characteristics, the same meaning and the same kind of loads.

20 Claims, 6 Drawing Sheets

TRANSMISSION AND RECEPTION INTERFACE AND METHOD OF DATA TRANSMISSION

BACKGROUND OF THE INVENTION

1. Field of the Invention

The present invention relates to transmission and reception interfaces and especially to the data transmission and data synchronization between sender and receiver, such as, for example, between integrated circuits.

2. Description of Prior Art

The need for fast transmission with simultaneous data synchronization is high, especially in the field of working memories and in particular in the interface between the working memory and the requesting controller. Examples of memory technologies in which synchronization takes place in data transmission are, for example, SDRAM technology (SDRAM=Synchronous Dynamic Random Access Memory) and DDR SDRAM technology (DDR SDRAM= Double Data Rate Synchronous Dynamic Random Access Memory). It is common to all those technologies that in addition to the actual data, such as, for example, read or write data, a clock signal and/or strobe signal is transmitted to obtain synchronization between the controller and the memory chip and vice versa. DDR technology essentially differs from SDRAM technology in that sampling the data takes place at both the rising and the falling edge of the strobe or the clock, respectively.

In the interface between a DDR chip and a controller and vice versa, apart from data, a differential clock signal and a source-synchronous strobe or signal, respectively, are transmitted, of which the latter must be transformed into an internal clock signal with a phase shift of 90° by means of DLL. An example of a possible solution for data transmission between a sender 900 and a receiver 902 is shown in FIG. 5. The interface arrangement illustrated in FIG. 5 concerns the case of an interface between a controller 900 and a DDR SDRAM 902, which are connected to each other via four data lines 904, 906, 908 and 910 DQ0–DQ3 and a strobe signal line 912 DQS. Internally, the receiver 902 consists of a plurality of receiver units or differential amplifiers, respectively, 914, 916, 918, 920 and 922, of which a respective input, in this case the non-inverting input, is connected to a line of the lines 904 to 912 and the other input is connected to a reference voltage 924. The reference voltage 924 can be transmitted from the sender 900 to the receiver 902 as an additional signal, produced at a separate voltage generator or derived from a supply voltage at the receiver.

For synchronizing the data transmission between the sender 900 and the receiver 902, the sender 900 controls the strobe signal DQS in such a way that it comprises a signal transition, i.e. a reference voltage level transition, in the middle of each data cycle. The receiver 902 monitors the line 912 DQS upon a transition of the strobe signal DQS. When the transition on the line DQS 912 is detected, the receiver considers the data at the output of each receiver unit 916 to 922 connected to the data lines 904 to 910 as valid and samples it.

A disadvantage in the interfaces of the DDR and the SDRAM type is that, by the separation of the data lines from the clock signal lines the lines participating in the data transmission comprise different electrical characteristics and in particular different kinds of loads, which may lead to an impediment of synchronism and thus to a restriction of the transmission speed. It is of especial disadvantage for the interface of the DDR type illustrated in FIG. 5 that, at the transmission side end of the interface, a circuit, such as for example a DDL (DDL=Delay Locked Loop) (not shown) must be present, which must produce a delay of exactly one fourth of the clock period, and that a stable reference direct voltage VREF must be provided. Due to the fact that in SDRAM technology no edge-controlled sampling is performed, the data transmission rate in this interface technology is lower and restricted to about 150 MHz for longer busses. A further disadvantage of these interfaces is that all the lines can switch from 0 to 1 or from 1 to 0 and thus the supply system must be designed for higher peak currents. In addition, in these interfaces, the signal swing is only related to VREF and thus only half as large.

In the U.S. Pat. Nos. 6,151,648 and 6,160,423, issued to Jazio, Inc., an interface technology is described in which two fixed lines are used to transmit two source-synchronous voltage and timing reference signals apart from data. These signals SSVTR and /SSVTR (SSVTR=Source Synchronous Voltage and Timing Reference) are operated with levels opposite to each other and change their level every time valid data is driven on the data lines. The data is sampled by the receiver at times shortly following the times at which the signals SSVTR and /SSVTR change their levels. For sampling the data on the data lines, each data line is, on the receiving side, connected to a first input of two comparators, the second input of which is connected to the signal SSVTR or /SSVTR, respectively. Each receiver unit of a data line consisting of the two comparators thus produces two comparison signals at the outputs of the two comparators. Which comparison signal of the two comparison signals is taken for sampling depends on whether the signal level on the data line has changed between two subsequent samples or SSVTR and /SSVTR transitions, respectively, or not. In the change of the signal level on the data line, the output signal of that comparator is maintained, the output signal of which has been used for sampling the last time. Otherwise, the output signal of the respective other comparator is used for sampling. In this manner a high level difference at the inputs of the comparator is obtained in each sample, the output signal of which is used for sampling.

As in the interfaces of the DDR SDRAM type and the SDRAM type, however, a disadvantage of the interfaces according to the U.S. patents mentioned above is that the lines taking part in the transmission comprise considerably different electrical kinds of loads, i.e. the data lines are connected to fewer comparators than the source-synchronous voltage and timing reference signals.

SUMMARY OF THE INVENTION

It is the object of the present invention to provide a reception interface and a transmission interface and a method so that data transmission and data synchronization enable a safer and/or faster data transmission.

In accordance with a first aspect of the invention, this object is achieved by a method of producing an N-bit word from an M-bit code received on an M-bit line, M being larger than N, the M-bit code comprising at least an M-bit code word and a previous M-bit code word, the M-bit code word comprising different levels at at least two bit positions, and the previous M-bit code word comprising levels opposite to the different levels at the corresponding bit positions, wherein the method comprises comparing the levels at the two bit positions of the M-bit code word to obtain a first value, comparing the levels at the two corresponding bit positions of the previous M-bit code word to obtain a second value, detecting that the first value is opposite to the second value, and decoding the M-bit code word responsive to detecting that the first value is opposite to the second value.

In accordance with a second aspect of the invention, this object is achieved by a reception interface for generating an N-bit word from an M-bit code received on an M-bit line, M being larger than N, the M-bit code comprising at least an M code word and a previous M-bit code word, the M-bit code word having different levels at at least two bit positions, and the previous M-bit code word, at the corresponding bit positions, having levels opposite to the different levels, wherein the reception interface comprises a comparator for comparing the levels at the two bit positions of the M-bit code word to obtain a first value and for comparing the levels at the two corresponding bit positions of the previous M-bit code word to obtain a second value, a detector for detecting that the first value is opposite to the second value, and a decoder for decoding the M-bit code word responsive to detecting that the first value is opposite to the second value.

In accordance with a third aspect of the invention, this object is achieved by a method of transmitting an M-bit code to a reception interface on an M-bit line, the M-bit code comprising at least an M-bit code word coding an N-bit word to be transmitted and a previous M-bit code word, M being larger than N, wherein the method comprises selecting the M-bit code word from a plurality of M-bit follower code words by means of the N-bit word to be transmitted, each of the plurality of M-bit follower code words comprising different levels at at least two bit positions, and the previous M-bit code word having levels opposite to the different levels at the corresponding bit positions, and outputting the M-bit code word.

In accordance with a fourth aspect of the invention, this object is achieved by a transmission interface for transmitting an M-bit code to a reception interface on an M-bit line, the M-bit code comprising at least an M-bit code word coding an N-bit word to be transmitted and a previous M-bit code word, M being larger than N, wherein the transmission interface comprises means for selecting the M-bit code word from a plurality of M-bit follower code words by means of the N-bit word to be transmitted, each of the plurality of M-bit follower code words comprising different levels at at least two bit positions, and the previous M-bit code word comprising levels opposite to the different levels at the corresponding bit positions, and means for outputting the M-bit code word.

The present invention is based on the recognition that the prior separation between the clock signal or synchronization line/s, respectively, and the data lines in transmission between a transmission and a reception interface can be dispensed with, and that a safer and thus eventually even faster data transmission can be obtained by integrating the synchronization information for the transmission of an N-bit signal into an M-bit code into which the N-bit signal is coded.

According to the invention, the integration of the synchronization information into the M-bit code is obtained by coding each N-bit word to be transmitted into an M-bit code word comprising different levels at least at two bit positions, and by the fact that the previous M-bit code word, at the corresponding bit positions, has levels opposite to the different levels. At the reception side, only the value resulting from a comparison of the levels at the two bit positions of the M-bit code word and the value resulting from a comparison of the levels at the two corresponding bit positions of the previous M-bit code word have to be compared and it must be detected that the first value is opposite to the second value to produce synchronization between sender and receiver, i.e. to reliably determine the data transition time.

According to this, it is possible according to the invention that the synchronization information is transmitted on the same lines as the data information, and that consequently all the lines taking part in the transmission have the same electrical characteristics, the same meaning and the same kind of loads.

According to an embodiment of the present invention, at the reception interface, the levels are compared at each pair of two bit positions of the M-bit code word, in which the levels at the pair of corresponding bit positions of the previous M-bit code word differ, to compare the resulting values for each pair to values resulting from a comparison of the levels at the pairs of corresponding bit positions of the previous M-bit code word, wherein, upon detecting that in at least one pair of two bit positions the corresponding values are opposite to each another, decoding the M-bit code word is performed based on at which pairs the two values are opposite to each other. Thus an advantage is that, due to the fact that decoding is based on detecting level transitions at pairs of two respective bit positions or bit lines, respectively, from two different levels to levels opposite to same, a signal transmission with double the swing is obtained, i.e. with a signal swing which is basically twice as large as the signal swing at the individual bus lines of the M-bit line. It is not necessary to provide a reference voltage VREF, as is necessary in the circuits according to the prior art.

According to an embodiment, the reception interface for performing the comparisons at those code lines at which the previous M-bit code word had different levels includes a plurality of comparators, each of which compares the levels at a different pair of lines of the N-bit line and outputs the resulting comparison signal to a multiplexer which passes on those comparison signals among the comparison signals which correspond to the comparison of levels at a pair of lines at which the previous M-bit code word had different levels, wherein among those comparison signals, according to the invention, there is at least one serving for synchronization and comprising a large or strong signal swing, i.e. transitions from a signal level corresponding to different levels at the inputs of the corresponding comparators to a signal level corresponding to levels opposite to the different levels at the inputs of the corresponding comparator. Since the comparison signals of those comparators, at the inputs of which the levels have reversed from the previous M-bit code word to the present M-bit code word, and the comparison signals of same consequently comprise a large transition or signal swing, respectively, reach the multiplexer faster than the comparison signals of those comparators at which the levels, at the inputs from the previous M-bit code word to the present M-bit code word, have changed from different levels to identical levels, the comparison signals with a large transition, due to the time reference, can be sampled for a certain period after detecting the at least one synchronization offset signal, without the other comparison signals having changed, whereby the effective signal swing among the comparison signals detected essentially corresponds to double the signal swing of the code.

BRIEF DESCRIPTION OF THE DRAWINGS

Preferred embodiments of the present invention are subsequently detailed referring to the appended drawings, in which.

DESCRIPTION OF PREFERRED EMBODIMENTS

An embodiment of the present invention will be described in detail referring to FIGS. 1 to 4.

Figure 1:
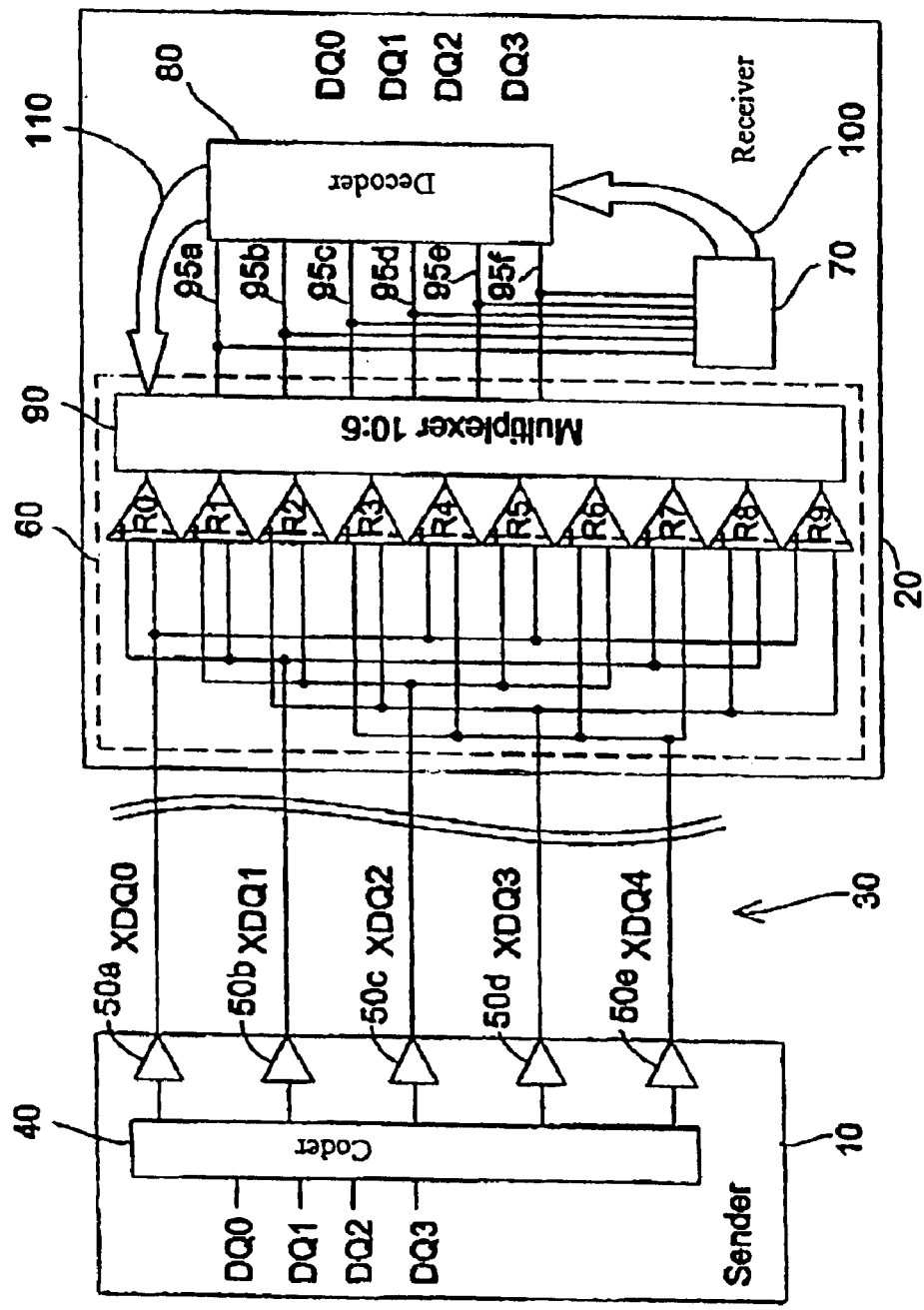
FIG. 1 is a block diagram showing an interface arrangement with a transmission interface and a reception interface according to an embodiment of the present invention.
Figure 2:
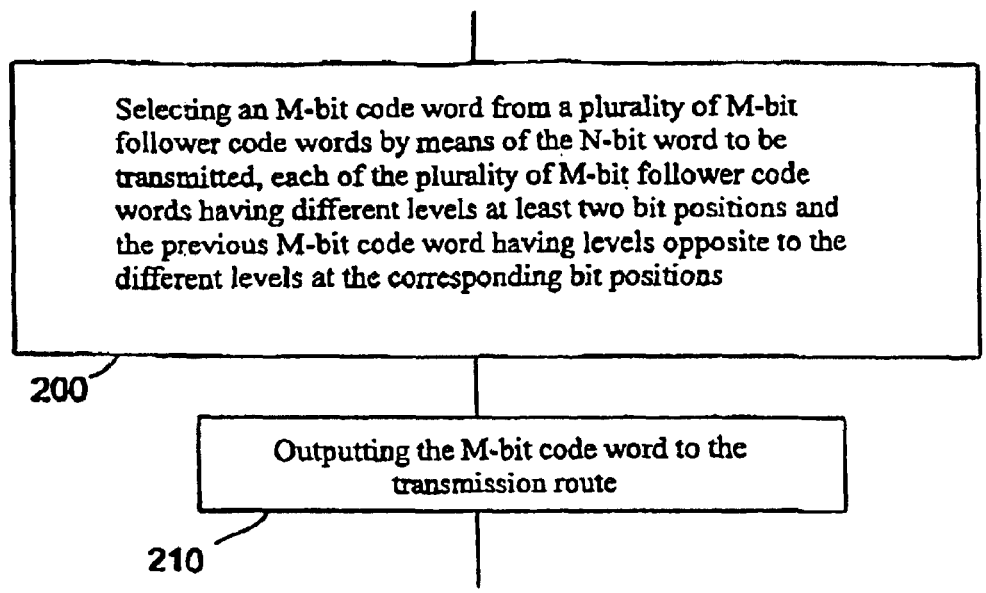
FIG. 2 is a flow chart showing the steps taking place in the transmission interface of FIG. 1 according to an embodiment of the present invention.
Figure 3:
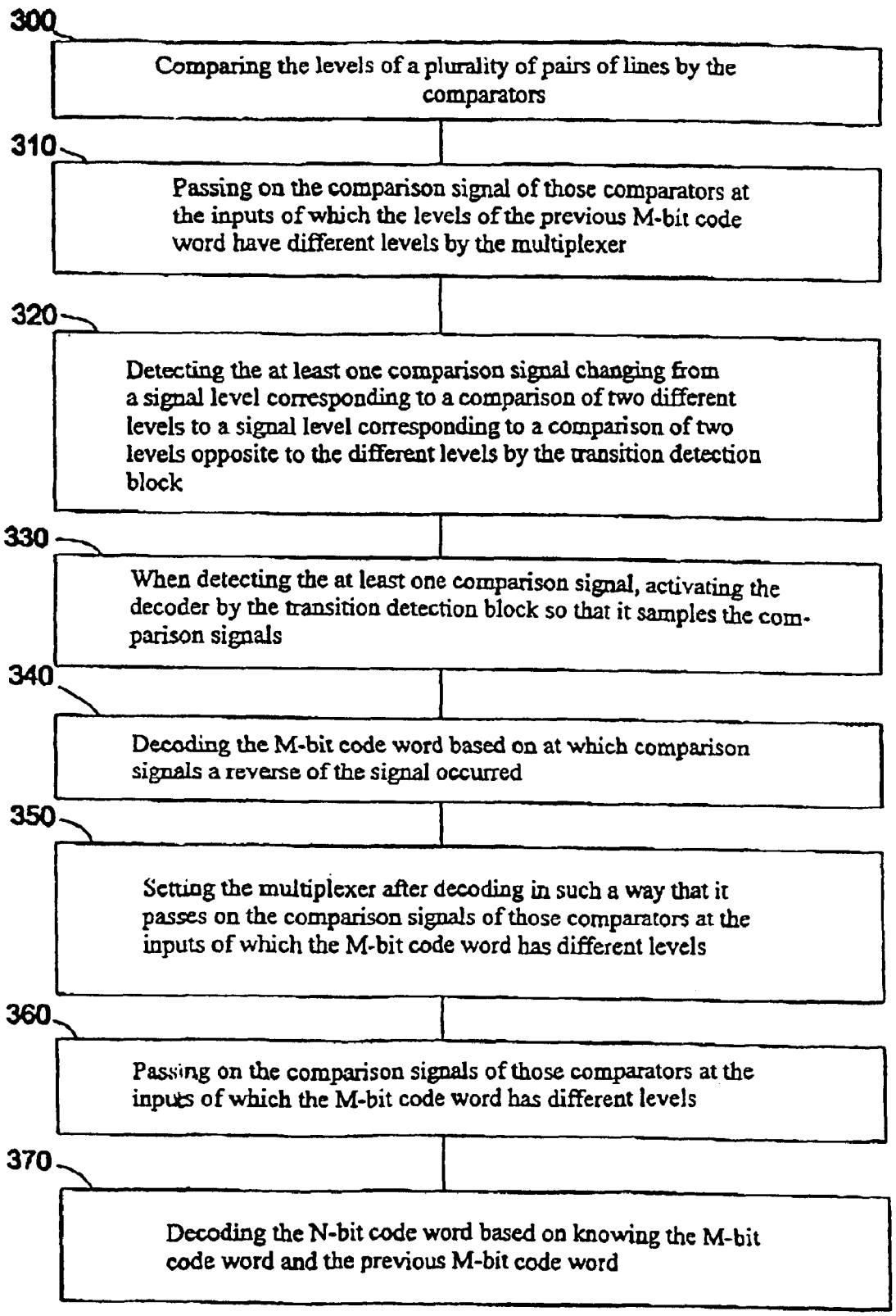
FIG. 3 is a flow chart showing the steps occurring in the reception interface of FIG. 1 according to an embodiment of the present invention.
Figure 4:
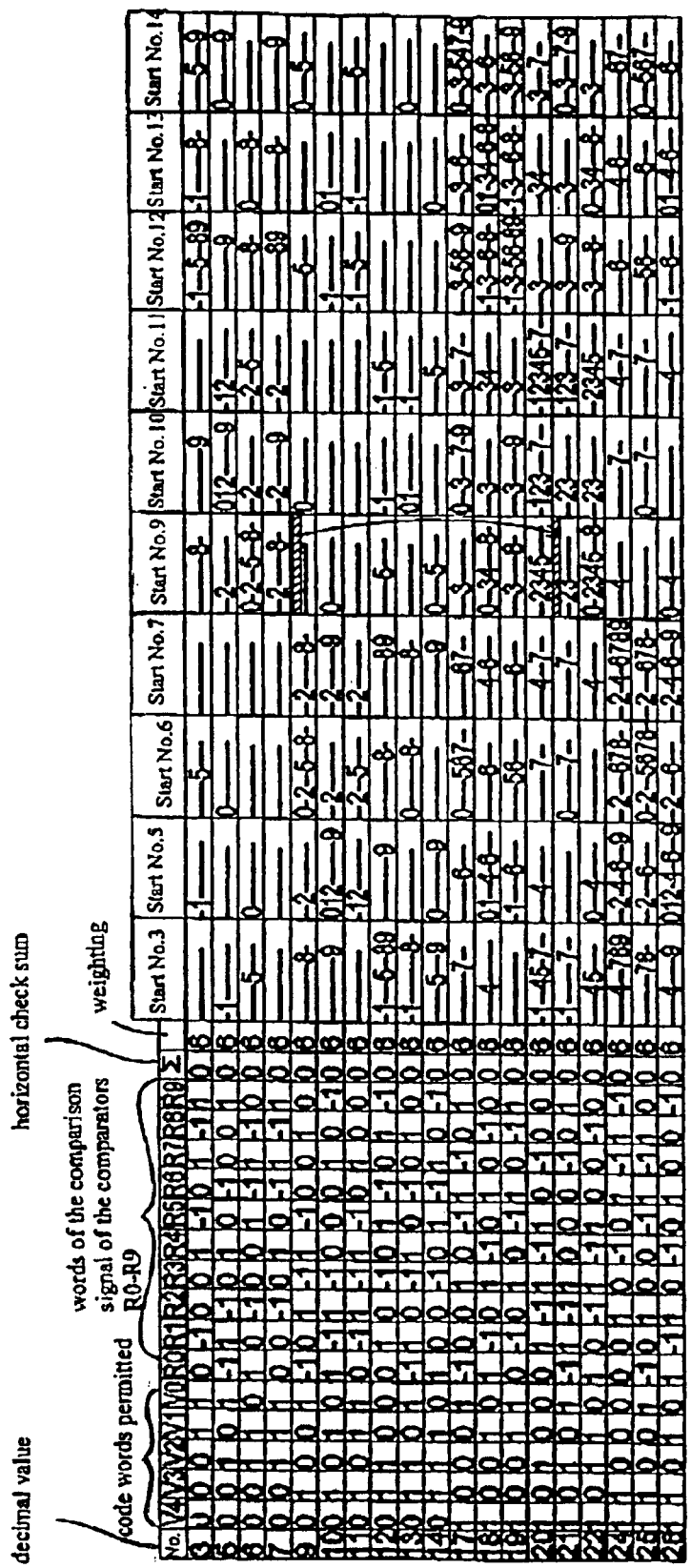
FIG. 4 is a table, which indicates, for permitted code words, the resulting comparison signals at the comparators of the reception interface of FIG. 1, the sum of the comparison signal values, the weighting, and, for various previous code words, that comparators, at the inputs of which the levels of the previous code word are different and the levels of the permitted code word are opposite to those of the previous code word.
Figure 5:
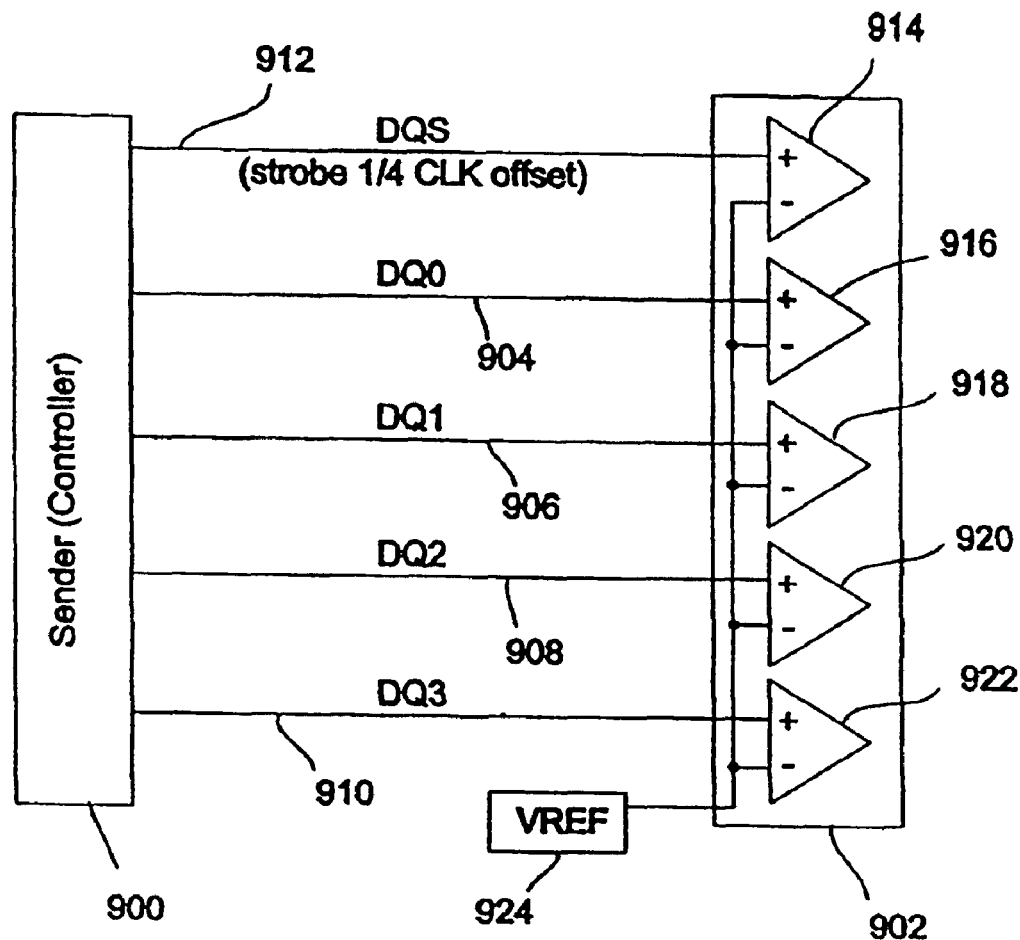
FIG. 5 is a block diagram showing an interface arrangement of the prior art.

FIG. 1 shows the block diagram of an interface arrangement of a transmission interface and a reception interface according to an embodiment of the present invention, while FIGS. 2 and 3 illustrate the steps occurring in the transmission interface and the reception interface. FIG. 4 is a table listing, for a part of the code words permitted for coding, information serving for illustrating the mode of operation of the transmission and reception interface of FIG. 1.

In the following, the architecture of the interface arrangement of FIG. 1 will be explained first. The transmission interface or the sender, respectively, in general shown at 10, is connected to the reception interface or the receiver, respectively, indicated in general at 20, via a 5-bit line 30 consisting of five lines XDQ0, XDQ1, XDQ2, XDQ3 and XDQ4. The sender 10 includes a coder 40 receiving four bits DQ0, DQ1, DQ2 and DQ3 of a 4-bit word at four inputs, wherein the 4-bit word is to be communicated to the receiver 20. The sender 10 further includes five amplifiers or line drivers, respectively, 50a, 50b, 50c, 50d and 50e, via which the five outputs of the coder 40 are connected to the five lines XDQ0–XDQ4 of the 5-bit line 30.

The receiver 20 includes reference means 60, a transition detection block 70 and a decoder 80. Reference means 60 includes 10 comparators R0, R1, R2, R3, R4, R5, R6, R7, R8 and R9 or operation amplifiers or receiver units, respectively, each of which comprises an inverting (indicated by a "−" sign) and a non-inverting input (indicated by a "+" sign) and an output. The two inputs of each comparator R0–R9 are connected to a different pair of lines XDQ0–XDQ4. The number of comparators is Σi, wherein i=1 ... M−1, M being the number of lines of the M-bit line (i.e. 5) so that the levels at each possible pair of lines XDQ0–XDQ4 are compared. For M>5, it is not necessary to compare the levels of all the pairs of lines, so that the number of comparators can be reduced.

Reference means 60 further includes a multiplexer 90 having 10 inputs and 6 outputs. The 10 inputs of the multiplexer 90 are connected to the output of each comparator R0–R9. The outputs of the multiplexer 90 are connected to six inputs of the decoder 80 and to six inputs of the transition detection block 90 via six lines 95a, 95b, 95c, 95d, 95e and 95f. As is illustrated by the arrows 100 and 110, the transition detection block 70 is able to transmit an activation signal to the decoder and the decoder 80 is able to transmit an activation signal to the multiplexer 90. The decoder 80 includes four outputs at which it or the receiver 20, respectively, after performing the processing of the received 5-bit code word, which will be explained subsequently, outputs the N-bit word to be received on the lines XDQ0 to XDQ4.

To illustrate the mode of operation and the co-operation of the sender 10 and the receiver 20, referring to FIG. 2, the steps performed by the sender 10 will be described first, wherein at the same time reference is made to FIGS. 1 and 4.

In a step 200, the coder 40 selects a 5-bit code word from a plurality of 5-bit follower code words by means of the 4-bit word to be transmitted consisting of the bits DQ0–DQ3, wherein each of the plurality of 5-bit follower code words comprises different levels at at least two bit positions and wherein the previous N-bit code word comprises levels opposite to the different levels at the corresponding positions.

To illustrate the facts, a table is shown in FIG. 4, which, for each of a part of 5-bit code words permitted, the bits V4–V0 of which are given in the columns 2 to 6, indicates the respective decimal number in the first column, the values of the comparison signals or the output voltages, respectively, of the comparators R0–R9 for the respective code word permitted in the columns 7 to 16, the sum of comparison signals for the respective code word permitted in column 17, the weighting of the respective code word permitted in column 18 and the numbers of that comparators R0–R9 at which the values of the comparison signals change from a previous code word to the respective code word permitted in the columns 19 to 28, in the case that the previous code word is a permitted code word with the decimal value of 3, 5, 6, 7, 9, 10, 11, 12, 13 or 14. The code word permitted missing or not listed, respectively, in the table of FIG. 4 is $11100_b$ or $28_d$ respectively.

The code words permitted for transmitting between the sender 10 and the receiver 20, in the present embodiment, are restricted to those among the possible 32 (=$2^5$) 5-bit codings, in which two or three bits have a logic value of 1. In the present embodiment this restricts the number of 5-bit code words permitted to 20 out of 32 possible ones. As can be seen from the table of FIG. 4, it is achieved by this restriction of the code word permitted to code words, in which roughly half of all the bits have a logical value of 1, that the sum of the values of the comparison signals of the comparators R0–R9 is 0 for each code word permitted, and that the weighting of each code word permitted, i.e. the number of pairs of bit positions at which the difference of the bit values is unequal to 0, is 6. Due to the weighting of 6, the number of pairs of bit positions at which the levels of the follower code word are opposite to the ones of the previous code word is consequently restricted to 6.

Although the number of code words permitted is 20, the number of 5-bit follower code words for each previous code word is, as will be explained, restricted to 16, since, according to the invention, they must comprise at least one pair of bit positions at which the levels or bit values, respectively, of the previous 5-bit code word transmitted before from the sender 10 to the receiver 20 have been different and at which the levels or bit values, respectively, of the follower code word are opposite to these different levels. Each of the 16 5-bit follower code words comprises, at different, and at at least one, pairs of bit positions at which the previous code word comprises different levels, levels which are opposite to the different levels of the previous code word. A possible 4-bit coding is to be assigned to each of the 16 (=$2^4$) various follower code words or to each possible combination of pairs of bit positions with a reverse of the different bit values. A possible mode of assignment is to arbitrarily assign one of the possible codings of the 4-bit word to be transmitted to the possible 16 follower code words for each possible previous code word permitted so that there are 16×20 assignments. They could be indexed, on the transmission side, by indicating the previous code word and the 4-bit word to be communicated and, on the reception side, by indicating the previous code word and the combination of pairs of bit positions detected with a reverse of the different levels.

Referring to FIG. 2, after explaining coding according to the present embodiment, an example of the selection of a 5-bit code word in step 200 will be described, supposing that the sender 10 has already sent a 5-bit code word from $01001_b$ to the receiver 20 and that the coder 40 is for example to transmit a 4-bit word DQ0–DQ3 from $0100_b$. Among the possible follower code words there are the code words permitted with the decimal values of 3, 5, 6, 7, 10, 12, 14, 17, 18–22, 24, 26 and 27, as can be seen from column No. 24 of the table of FIG. 4 by the fact that these code words permitted comprise at least one pair of bit positions at which the bit values or levels, respectively, are different and opposite to those of the previous code word $10101_b$. Consequently the coder 40 selects, among the 16 possible follower code words, that which is assigned to the 4-bit value of $0100_b$, wherein it is assumed as an example that this is the case for the 5-bit follower code word $10101_b$. This word is the 5-bit code word which the coder 40 is to transmit to the receiver 20 instead of the 4-bit word. The sender 10 can for example comprise a look-up table (not shown) which the coder 40 accesses by means of the previous n-bit code word and the 4-bit word to be transmitted to establish the 5-bit follower code word to be transmitted.

After the selection of the 5-bit code word, the coder 40 transmits the selected 5-bit code word to the receiver 20 in a step 210 via the line drivers 50a–50e which amplify the logic voltage levels corresponding to the bits of the 5-bit code word and via the lines XDQ0–XDQ4.

After, referring to FIGS. 2 and 4, the steps to be performed by the sender 10 have been described according to an embodiment of the present invention, those steps will be described referring to FIG. 3, which the receiver 20 performs for producing the 4-bit word from the 5-bit code word received by the sender 10, wherein in the description of FIG. 3 reference is also made to FIGS. 1 and 4.

In a step 300 the levels of each pair of lines XDQ0–XDQ4 are at first compared by the comparators R0–R9. In particular, the comparators R0–R9 compare the levels of the pairs of lines XDQ1 and XDQ0, XDQ2 and XDQ1, XDQ3 and XDQ2, XDQ4 and XDQ3, XDQ0 and XDQ4, XDQ2 and XDQ0, XDQ4 and XDQ2, XDQ1 and XDQ4, XDQ3 and XDQ1 or XDQ0 and XDQ3, respectively, to one another. In a step 310 the multiplexer 90 passes the comparison signals of those comparators R0–R9 on to the outputs of it, at the inputs of which the levels of the previous 5-bit code word comprise different levels. In the embodiment exemplary described referring to FIG. 2, in which the sender 10 has sent $0101_b$ as the previous code word and, as the current 5-bit code word, sends $10101_b$, the comparison signals of the comparators R0, R2, R3, R4, R5 and R8 are passed on by the multiplexer 90, the values of which are −1, −1, 1, 0, 0 and 0, respectively, and correspond to those pairs of bit positions at which the previous code word comprises different bit values.

As has already been described referring to FIG. 4, the number of comparators, at the inputs of which the levels of the previous 5-bit code word have different levels is six for each pair of a previous and a current code word. The multiplexer 90 outputs the comparison signals of these six comparators to the decoder 80 and the transition detection block 70 at the lines 95a to 95f in a predetermined order, such as, for example, in the order of their occurrence in the arrangement from the top to the bottom illustrated in FIG. 1. It is noted that the multiplexer has already passed on the comparison signals of the same comparators on the lines 95a to 95f in the previous 5-bit code word in a step corresponding to a step 360 to be described hereinafter. In the case of the previous example in which the previous 5-bit code word is $01001_b$ and the current 5-bit code word is $10101_b$, the signal levels on the lines 95a–95f consequently change from −1 to −1, from 1 to −1, from −1 to 1, from 1 to 0, from −1 to 0 or from 1 to 0. As has been discussed referring to FIG. 4, the follower code words which the sender 10 selects for each previous 5-bit code word are structured in such a way that the levels at the inputs of at least one comparator are different and reverse. This means that, per output of the comparison signals by the multiplexer 90, at least the signal level on one of the lines 95a to 95f changes from a signal level corresponding to a comparison of two different levels to a signal level corresponding to a comparison of two levels opposite to the different levels. As can be seen from FIG. 4, in the previous example with the previous 5-bit code word $01001_b$ and the current 5-bit code word $10101_b$, the comparison signals of the comparators R2 and R3 change from a signal level of 1 to a signal level of −1 or from a signal level of −1 to a signal level of 1, respectively.

In a step 320 the transition detection block 70 detects the transition of the at least one comparison signal on the lines 95a to 95f from a signal level of −1 to 1 or from 1 to −1, wherein these transitions will be referred to as strong transitions, and correspond to a signal swing essentially corresponding to double the signal swing of the 5-bit code on the lines XDQ0–XDQ4. The transition detection block 70 can for example comprise a plurality of univibrators detecting the strong transition on a respective one of the lines 95a–95f.

As soon as the transition detection block 70 has detected a strong transition on at least one of the lines 95a to 95f, it activates the decoder 80 by the activation signal 100, so that it samples the signal level on the lines 95a–95f for example by register circuits or collects the comparison signals output by the multiplexer 90. Due to the fact that transitions of the signal levels on the lines 95a–95f from −1 to 0 or from 1 to 0 propagate considerably slower through the comparators R0 to R9 than the strong transitions, these transitions do not manifest themselves in a change of the signal level at the time at which the decoder 80 is activated, i.e. a strong transition is detected. Although in the exemplary embodiment of FIG. 4 the comparison signals output by the multiplexer 90 on the lines 95a to 95f consequently are −1, −1, 1, 0, 0 and 0, the decoder 80 detects or catches, respectively, signal levels of −1, −1, 1, 1, −1 or 1 on the lines 95a to 95f, since the transitions from −1 to 0 and from 1 to 0 do not yet show at the point of sampling. The period of time from detecting a strong transition to receiving or sampling the signals output by the multiplexer 90 determines the maximum steepness permitted (slew rate) of the transition on the XDQ lines.

In a step 340 the decoder 80 decodes the M code word based on at which comparison signals a strong transition occurred, which in the example are the comparison signals of the comparators R2 and R3. As has already been described referring to FIG. 2, a 4-bit word is associated to each follower code word or each combination of strong comparison signal transitions, respectively, for a certain previous code word. In order for the decoder 80 to know the previous 5-bit code word, it is provided in the present embodiment that the sender 10, before inserting an actual transmission sequence, transmits a starting word as a preamble, which is known to the decoder 80, and from which the decoder 80, from a current 5-bit code word, establishes the 4-bit word communicated by means of the assignment between the follower code word and the occurrence of strong transitions at the lines 65a to 65f or by means of which the coder 80 can track the sequence of 5-bit code words. Another possibility would be that the decoder 80 includes further inputs connected to the lines XDQ0–XDQ4, so that the decoder 80 can receive the current 5-bit code word directly.

In a step 350 the decoder 80 readapts the multiplexer 90 via the activation signal 110 after decoding in such a way that it passes on the comparison signal of those comparators at the inputs of which the current 5-bit code word has different levels. This step ensures for the reception of the next code word that, on the lines 95a to 95f, the signal levels of those comparators are applied, at which the code word, which is, from the point of view of the next code word, the previous one, i.e. the current code word, has different levels so that the transition detection block 70 detects the correct transitions.

In a step 360 the multiplexer 90, responding to the activation signal 110 from the decoder 80, passes on the comparison signals of those comparators to the outputs or to the lines 95a to 95f, respectively, at the inputs of which the current 5-bit code word has different levels.

As has already been mentioned, the steps 350 to 360 serve for preparing the reception of the next 5-bit code word which is sent by the sender 10, so that, first, those signal levels are on the signal lines 95a to 95f, which are related to the comparison of pairs of bit positions of the M-bit code word, at which the 5-bit code word has different levels and that, when the next 5-bit code word arrives at the comparator R0–R9, comparison signals of the same comparators are output on the lines 65a–65f. After step 360 the receiver 20 consequently starts anew at step 300 with a corresponding starting situation.

The embodiment described before referring to the FIGS. 1 to 4 thus provides a fully differential, self-clocked bus system for a high speed data transmission, in which, contrary to the bus systems or interface arrangements, respectively, described in the introduction of the description, information is interwoven or combined with timing or synchronizing information, respectively. The bus system presently described is especially advantageous in that no reference voltage is required, against which the data signals must be compared, double the voltage swing regarding the data to be evaluated exists, the number of worst case transitions is reduced and the lines taking part in the transmission are fully balanced, i.e. that the same load is on all the lines. All the bus signals have the same meaning and the same kind of loads.

All the signals are only compared to the other bus lines, wherein only pairs of lines having opposite values at that time are relevant so that double the swing is achieved for evaluating. All the signal lines switch simultaneously. The bus system is for rail-to-rail applications in which the signal voltage swing corresponds to the supply voltage. The synchronization information is incorporated into the code and thus distributed to all the data lines. The code is constructed in such a way that a signal change takes place in any case, wherein the signal change at the reception circuit is twice as large as the signal pressure of the individual bus lines so that a fully differential operation is obtained. The code is constructed in such a way that at no point all the lines switch to the supply voltage VDD or all the lines switch to the reverse voltage VSS. In the worst case roughly half the lines switch to VSS and half the lines switch to VDD, whereby a minimization of interferences and a minimization of the supply lines required is obtained.

Figure 6:
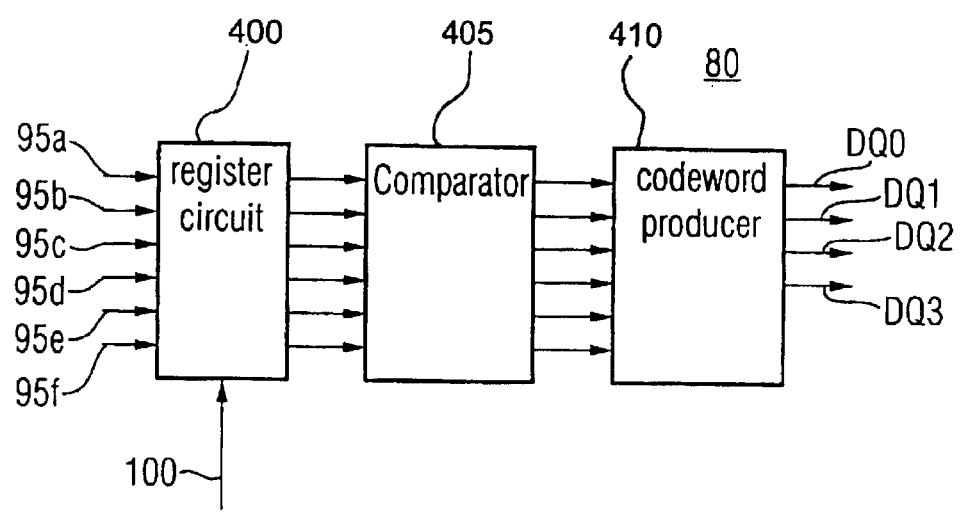
FIG. 6 is a block diagram showing the details of the decoder in accordance with an embodiment of the present invention.

FIG. 6 shows the details of decoder 80 in accordance with an embodiment of the present invention. As can be seen, the decoder comprises a register circuit 400, a comparator 405, and a code word producer 410. The register circuit 400 is connected to the outputs of multiplexer 90 via lines 95a to 95f. The register circuit 400 samples the comparison signals on the lines 95a to 95f output by multiplexer 90 responsive to the activation signal 100 from transition detection block 70. At the output of register circuit 400, sampled comparison signal values are obtained. The output of register circuit 400 is connected to the input of comparator 405. The comparator 405 compares the sampled comparison signal values obtained from register circuit 400 with comparison signals corresponding to a comparison of the different levels of the previous M-bit code word and detects those sampled comparison signal values being different to the corresponding ones of the plurality of comparison signals corresponding to the comparison of the different levels of the previous M-bit code word. The code word producer 410 receives the detection result and produces an M-bit code word DQ0–DQ3 depending on the detection result and previous M-bit code word.

After a special embodiment of the present invention has been described before, it is noted that the present invention is applicable to every interface between a sender circuit or a sender, respectively, and a reception circuit or a receiver, respectively, and in particular to interfaces or a data transmission between integrated circuits.

Referring to the table of FIG. 4, it is pointed out that the table is non-exclusive, but that it can be completed easily based on the description and by symmetry considerations. These symmetry considerations can also be used to reduce the look up table mentioned before for storing the association between words to be transmitted or to be received, respectively, on the one hand and previous code words and follower code words or combinations detected of comparison signal with a strong transition on the other hand.

It is also pointed out that, although the above description has only been related to the transmission of a 4-bit word, the present invention was also applicable to any bus width. In addition the invention is not limited to a specific voltage interface standard. The assignment of the 4-bit data word to be transmitted to the strong transitions is arbitrary and is preferably determined in such a way that the decoder 80 can be implemented easily.

Referring to the comparators R0–R9 and the multiplexer of FIG. 1 and the steps at 300 and 310 of FIG. 3 it is pointed out that, in the result, they perform a comparison between each pair of bit positions at which the previous (in step 310 of FIG. 3) or the current (in step 360 of FIG. 3) code word, respectively, has different levels. Comparative means 60 which in the case of FIG. 1 is formed by the comparators R0–R9 and the multiplexer 90, however, can also be formed by using a 5:12 multiplexer and only 6 comparators so that the number of comparators required is reduced. In this case the five inputs of the 5:12 multiplexer would be connected to the lines XDQ0–XDQ4, while the 12 outputs would be connected to two respective inputs of the only six comparators. The 5:12 multiplexer would apply the levels of those pairs of bit lines in pairs at the outputs, at which the previous (step 310 of FIG. 3) or the current (step 360 of FIG. 3) code word, respectively, has different levels.

It is also pointed out that, although the above description has been related to a special coding which used the strong transitions at the outputs of reference means 60, the present invention is not limited to this coding. The present invention can also directly base on the decoding of the M bits of the M-bit code words themselves, wherein, however, the advantage of double the swing in relevant data taken for decoding is dropped.

It is also to be noted that in addition mixings between an inventive data transmission and a data transmission according to one of the examples mentioned in the introduction of the description are feasible. Thus further transmission lines could, for example, be provided apart from the XDQ lines, on which it is exclusively data information, and not synchronization or timing information, respectively, which is transmitted.

What is claimed is:

1. A method of producing an N-bit word from an M-bit code received on an M-bit line, M being larger than N, said M-bit code comprising at least an M-bit code word having M-bit positions and a previous M-bit code word having M-bit positions, each of the M-bit positions of the M-bit code word corresponding to one of the M-bit positions of the previous M-bit code word, said M-bit code word comprising different levels at least at two bit positions, and said previous M-bit code word comprising levels opposite to said different levels at the corresponding bit positions, the method comprising:

comparing said levels at the two bit positions of said M-bit code word to obtain a first value;

comparing said levels at the two corresponding bit positions of said previous M-bit code word to obtain a second value;

detecting that said first value is opposite to said second value; and decoding said M-bit code word responsive to detecting that said first value is opposite to said second value.

2. A reception interface for generating an N-bit word from an M-bit code received on an M-bit line, M being larger than N, said M-bit code comprising at least an M code word having M-bit positions and a previous M-bit code word having M-bit positions, each of the M-bit positions of the M-bit code word corresponding to one of the M-bit positions of the previous M-bit code word, said M-bit code word having different levels at least at two bit positions, and said previous M-bit code word, at the corresponding bit positions, having levels opposite to said different levels, the reception interface comprising:

a comparator for comparing said levels at the two bit positions of said M-bit code word to obtain a first value and for comparing said levels at the two corresponding bit positions of said previous M-bit code word to obtain a second value;

a detector for detecting that said first value is opposite to said second value; and a decoder for decoding said M-bit code word responsive to detecting that said first value is opposite to said second value.

3. The reception interface according to claim 2, wherein to each bit position of said M-bit code word and said previous M-bit code word a different line of said M-bit line is associated, and wherein said comparator for comparing comprises:

a plurality of comparators having a first and a second input and an output, said first and said second input of each comparator being connected to a different pair of different lines of said M-bit line, for outputting comparison signals regarding the levels of said M-bit code word at said first and said second input; and a multiplexer having a plurality of inputs and a plurality of outputs, each input being connected to an output of a different of said plurality of comparators, for outputting said comparison signals of only those comparators to one of said plurality of outputs, at the first input and the second input of which the levels of said previous M-bit code word had different levels.

4. The reception interface according to claim 3, wherein said detector for detecting comprises:

signal level transition detector connected to said plurality of outputs of said multiplexer for detecting a transition of said comparison signal at at least one output of said plurality of outputs of said multiplexer from a first signal level corresponding to different levels at said first and said second input of said comparator outputting said comparison signal to a second signal level corresponding to said levels opposite to said different levels at said first and said second output of said comparator outputting said comparison signal.

5. The reception interface according to claim 4, wherein said decoder for decoding comprises:

a register circuit connected to the outputs of said multiplexer for sampling said comparison signals output by said multiplexer responsive to detecting the transition by said signal level transition detector to obtain a first plurality of sampled comparison signal values;

a comparator for comparing said first plurality of sampled comparison signal values and said plurality of comparison signals corresponding to a comparison of said different levels of said previous M-bit code word and for detecting those sampled comparison signal values being different to the corresponding ones of said plurality of comparison signals corresponding to a comparison of the different levels of said previous M-bit code word; and means for producing an N-bit code word depending on the result of detecting the outputs of said multiplexer and said previous M-bit code word.

6. The reception interface according to claim 5, wherein said means for decoding said M-bit code word is adapted to access a look-up table based on the result of detecting the outputs of said multiplexer and said M-bit code word to obtain said N-bit word.

7. The reception interface according to claim 5, wherein said decoder for decoding said M-bit code word is adapted to obtain said N-bit word based on the result of detecting the outputs of said multiplexer and said M-bit code word by means of a logic circuit.

8. The reception interface according to claim 4, wherein the difference between said first signal level and said second signal level basically is twice as large as the difference between said different levels at the first and said second input of one of said comparators.

9. The reception interface according to claim 3, wherein said multiplexer is adapted to output, responsive to an activation signal from said decoder for decoding, said comparison signal of those comparators at different of said plurality of outputs, at the first input and the second input of which the levels of said M-bit code word are different.

10. The reception interface according to claim 2, wherein said two bit positions can be different for different pairs of an M-bit code word and a previous M-bit code word.

11. The reception interface according to claim 2, wherein said comparator for comparing is adapted to compare said levels at several pairs of two bit positions of said M-bit code word, at which said levels at the pair of corresponding bit positions of said previous M-bit code word have different levels to obtain a first value for each pair and to compare said levels at the pairs of corresponding bit positions of said previous M-bit code word to obtain a second value for these pairs, wherein said detector for detecting is adapted to detect that in at least one pair of two bit positions said first value is opposite to said second value.

12. The reception interface according to claim 2, wherein said decoder for decoding is adapted to decode said M-bit code word based on said previous M-bit code word.

13. The reception interface according to claim 2, wherein the number of pairs of bit positions with different levels is equal for said previous M-bit code word and said M-bit code word.

14. A method of transmitting an M-bit code to a reception interface on an M-bit line, said M-bit code comprising at least an M-bit code word having M-bit positions and coding an N-bit word to be transmitted and a previous M-bit code word having M-bit positions, each of the M-bit positions of the M-bit code word corresponding to one of the M-bit positions of the previous M-bit code word, M being larger than N, the method comprising:

selecting said M-bit code word from a plurality of M-bit follower code words by means of said N-bit word to be transmitted, such that, each of said plurality of M-bit follower code words comprising includes different levels at least at two bit positions, and said previous M-bit code word having levels opposite to said different levels at the corresponding bit positions; and outputting said M-bit code word.

15. A transmission interface for transmitting an M-bit code to a reception interface on an M-bit line, said M-bit code comprising at least an M-bit code word having M-bit positions and coding an N-bit word to be transmitted and a previous M-bit code word having M-bit positions, each of the M-bit positions of the M-bit code word corresponding to one of the M-bit positions of the previous M-bit code word, M being larger than N, the transmission interface comprising:

means for selecting said M-bit code word from a plurality of M-bit follower code words by means of said N-bit word to be transmitted, such that, each of said plurality of M-bit follower code words includes different levels at least at two bit positions, and said previous M-bit code word includes levels opposite to said different levels at the corresponding bit positions; and means for outputting said M-bit code word.

16. The transmission interface according to claim 15, wherein said plurality of M-bit follower code words depends on said previous M-bit code word and is a true subset of a plurality of M-bit code words permitted.

17. The transmission interface according to claim 16, wherein said plurality of M-bit words permitted is a true subset of possible M-bit codings, each N-bit coding permitted basically having the same number of bit positions with one level and bit positions with a different level.

18. The transmission interface according to claim 15, wherein said number of M-bit follower code words is $2^N$, and wherein a different N-bit word is assigned to each M-bit follower code word.

19. The transmission interface according to claim 18, wherein said assignment of a M-bit follower code word to said corresponding N-bit word depends on at which pairs of bit positions at which said previous M-bit code word comprises different levels said M-bit follower code word has opposite levels.

20. The transmission interface according to claim 15, further comprising:

a look-up table in which said M-bit follower code words are stored, said means for selecting being adapted to access said look-up table by use of said previous M-bit code and said N-bit word to be transmitted as an index.

* * * * *